(12) United States Patent
Scholtes

(10) Patent No.: US 11,248,486 B2
(45) Date of Patent: Feb. 15, 2022

(54) AIRCRAFT TURBINE-ENGINE MODULE CASING, COMPRISING A HEAT PIPE ASSOCIATED WITH A SEALING RING SURROUNDING A MOVABLE IMPELLER OF THE MODULE

(71) Applicant: SAFRAN AIRCRAFT ENGINES, Paris (FR)

(72) Inventor: Christophe Scholtes, Vaux-le-Penil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 5 days.

(21) Appl. No.: 15/869,972

(22) Filed: Jan. 12, 2018

(65) Prior Publication Data
US 2018/0209291 A1    Jul. 26, 2018

(30) Foreign Application Priority Data
Jan. 20, 2017   (FR) ...................... 17 50475

(51) Int. Cl.
*F01D 11/24*   (2006.01)
*F01D 25/14*   (2006.01)
(Continued)

(52) U.S. Cl.
CPC .............. *F01D 11/24* (2013.01); *F01D 11/18* (2013.01); *F01D 25/14* (2013.01); *F04D 29/526* (2013.01);
(Continued)

(58) Field of Classification Search
CPC .......... F01D 11/24; F01D 25/14; F01D 11/18; F04D 29/584; F04D 29/526;
(Continued)

(56) References Cited

U.S. PATENT DOCUMENTS 4,199,300 A * 4/1980 Tubbs ..................... F01D 11/18
415/114
4,207,027 A * 6/1980 Barry ...................... F01D 5/181
416/96 R
(Continued)

FOREIGN PATENT DOCUMENTS

| EP | 2 770 168 A2 | 8/2014 |
|---|---|---|
| FR | 2 915 520 | 10/2008 |

(Continued)

OTHER PUBLICATIONS

French Preliminary Search Report dated Sep. 29, 2017 in French Application 17 50475 filed on Jan. 20, 2017 (with English Translation of Categories of Cited Documents).

*Primary Examiner* — David E Sosnowski
*Assistant Examiner* — Aye S Htay
(74) *Attorney, Agent, or Firm* — Oblon, McClelland, Maier & Neustadt, L.L.P.

(57) ABSTRACT

An aircraft turbine-engine module casing including an external module casing and at least one sealing ring intended to surround a movable impeller of the module and arranged radially towards the inside with respect to the external casing. The casing includes at least one capillary heat pipe, (Continued)

a first end which is fixed to the sealing ring, and a second end which, opposite to the first, is fixed to a casing element arranged radially towards the outside with respect to the ring.

12 Claims, 3 Drawing Sheets

(51) Int. Cl.
  *F01D 11/18* (2006.01)
  *F04D 29/58* (2006.01)
  *F04D 29/52* (2006.01)

(52) U.S. Cl.
  CPC ....... *F04D 29/584* (2013.01); *F04D 29/5853* (2013.01); *F05D 2240/11* (2013.01); *F05D 2240/14* (2013.01); *F05D 2240/55* (2013.01); *F05D 2260/208* (2013.01); *Y02T 50/60* (2013.01)

(58) Field of Classification Search
  CPC ............... F04D 29/5853; F04D 29/164; F05D 2240/11; F05D 2240/14; F05D 2240/55; F05D 2260/208; F05B 2260/208; F05B 2240/11
  USPC .................. 415/173.1, 170.6, 173.2, 173.3
  See application file for complete search history.

(56) References Cited

U.S. PATENT DOCUMENTS

| | | | | |
|---|---|---|---|---|
| 4,419,044 | A * | 12/1983 | Barry | F01D 11/24 415/117 |
| 5,178,514 | A * | 1/1993 | Damiral | F01D 11/08 415/114 |
| 5,192,186 | A * | 3/1993 | Sadler | F01D 11/18 415/177 |
| 5,639,210 | A * | 6/1997 | Carpenter | F01D 11/18 415/135 |
| 6,179,557 | B1 * | 1/2001 | Dodd | F01D 9/00 415/108 |
| 7,900,437 | B2 * | 3/2011 | Venkataramani | F01D 9/06 244/134 R |
| 7,900,438 | B2 * | 3/2011 | Venkataramani | F01D 9/065 244/134 B |
| 8,015,788 | B2 * | 9/2011 | Stephenson | F01D 5/046 415/114 |
| 2008/0073443 | A1 * | 3/2008 | Tollens | A01M 1/2044 239/4 |
| 2008/0292497 | A1 * | 11/2008 | Vangeneugden | C02F 1/46109 422/29 |
| 2011/0103939 | A1 * | 5/2011 | Zhang | F01D 11/18 415/173.2 |

FOREIGN PATENT DOCUMENTS

FR  3 038 656  1/2017
GB  2 060 077 A  4/1981

* cited by examiner

AIRCRAFT TURBINE-ENGINE MODULE CASING, COMPRISING A HEAT PIPE ASSOCIATED WITH A SEALING RING SURROUNDING A MOVABLE IMPELLER OF THE MODULE

TECHNICAL FIELD

The present invention relates to the field of aircraft turbine engines, and in particular to the field of turbine or compressor casings.

It relates in particular to the design of such casings, for the purpose of improving the management of the clearances at the end of the blades provided on the movable impellers surrounded by these casings.

PRIOR ART

As is known, in an aircraft turbine-engine compressor or turbine, the clearances at the top of the blades of movable impellers have a prime influence on the efficiency of the turbine engine. These clearances are mainly the consequence of mechanical phenomena and thermal phenomena.

The mechanical phenomena are various, such as the deformation of the rotor subjected to centrifugal forces, or the effects of duct pressures on the rotor and stator.

The thermal phenomena result mainly from the fact that, in a compressor or turbine, the parts constituting the rotor and stator generally have different coefficients of thermal expansion, and especially a different deformation rate because of a distinct environment. In general, the parts of the stator are more ventilated and have a lower mass, so that they react more quickly than the disc of an impeller, the inertia of which is mainly related to the mass of the disc root, often little ventilated.

These differences give rise to a difference in thermal response time which, in some operating phases, causes great opening of the clearances in operation, and therefore a reduction in performance of the turbine engine.

To meet this problem, there exist, in particular for the turbine, solutions aimed at actively regulating the clearance at the blade tip, by means of valves of the LPTACC or HPTACC type. Nevertheless, these valves require the taking off of air, which is also detrimental to the overall performances of the engine.

DISCLOSURE OF THE INVENTION

To at least partially respond to the above problem relating to the embodiments of the prior art, the invention first of all relates to an aircraft turbine-engine module casing comprising an external module casing and at least one sealing ring intended to surround a movable impeller of the module and arranged radially towards the inside with respect to said external casing, the casing comprising at least one capillary heat pipe, a first end of which is fixed to the sealing ring and a second end of which, opposite to the first, is fixed to a casing element arranged radially towards the outside with respect to the ring.

The invention is remarkable in that it uses a heat pipe within the casing, which makes it possible to modify the thermal response time of the sealing ring, by extraction/accumulation of heat in the direction of/coming from said casing element carrying the second end of the heat pipe. By virtue of this arrangement, the thermal response time of the sealing ring, which behaves as if it had a greater mass, is closer to the thermal response time of the movable impeller.

Because of this reduction in thermal response time difference between the impeller and the ring that surrounds it, the clearance at the blade tip advantageously changes within a restricted range of values during the operation of the turbine engine, which leads to an increase in the global performances thereof.

By way of example, after an acceleration phase, a conventional ring of the prior art has a tendency to deform more rapidly than the movable impeller with greater mass, with consequently an increase in the clearance at the blade tip and a loss of efficiency. By virtue of the invention, the heat pipe makes it possible to extract the heat from the sealing ring taken up by the hot primary stream. The heat pumped is next discharged radially outwards in a colder zone of the casing, at said casing element carrying the second end of the heat pipe, which in this case fulfills a function of condensation end.

The invention thus makes it possible to increase the performances of the turbine engine, without effecting any specific taking off of air. This is because, for the record, a heat pipe is a closed/passive system which, by profiting from changes in phase of a heat-transfer fluid, makes it possible to take off heat at one point and to redistribute it to another point without using a pump or other mechanical artifice. The functioning is such that a liquid is enclosed in a tube, which is normally composed of three parts, namely the evaporator, the condenser and the adiabatic zone. At the evaporator, the liquid adopts its gaseous form and is directed to the condenser, where it re-liquefies. The liquid is then taken to the evaporator by virtue of the capillary network that fulfils the role of heat-pipe engine. The condensed liquid thus returns to the hot end, referred to as the evaporation end, by capillarity. Thus, with a heat pipe, the heat is transferred from the hot portion to the cold portion by vaporisation of the liquid phase and condensation of the vapour in the cold part of the heat pipe.

The invention moreover provides for the use of at least one of the following optional features, taken in isolation or in combination.

The casing element to which the second end of the heat pipe is fixed is the external casing or means for mechanical connection of the sealing ring to the external casing.

The casing element to which the second end of the heat pipe is fixed is a fixing flange bolted to the casing, and/or the first evaporation end is welded to an external surface of the sealing ring.

The heat pipe comprises, between its first and second ends, an adiabatic zone fixed to means for the mechanical connection of the sealing ring to the external casing.

There are associated, with each sealing ring, a plurality of heat pipes distributed circumferentially around the ring concerned, so as to confer uniformity of the thermal profile in this direction.

Preferably, the heat pipes are each in the form of a tube, and these tubes may be independent of one another, or arranged within the same heat-pipe wall, annular in shape.

Preferably, each heat pipe is in the form of a non-straight tube.

Finally, another subject matter of the invention is an aircraft turbine engine such as a turbojet engine or a turboprop engine, comprising a module equipped with a casing as described above, the module being a turbine or a compressor.

Other advantages and features of the invention will emerge from the following non-limitative detailed description.

BRIEF DESCRIPTION OF THE DRAWINGS

This description will be given with regard to the accompanying drawings, among which.

DETAILED EXPOSURE OF PREFERRED EMBODIMENTS

Figure 1:
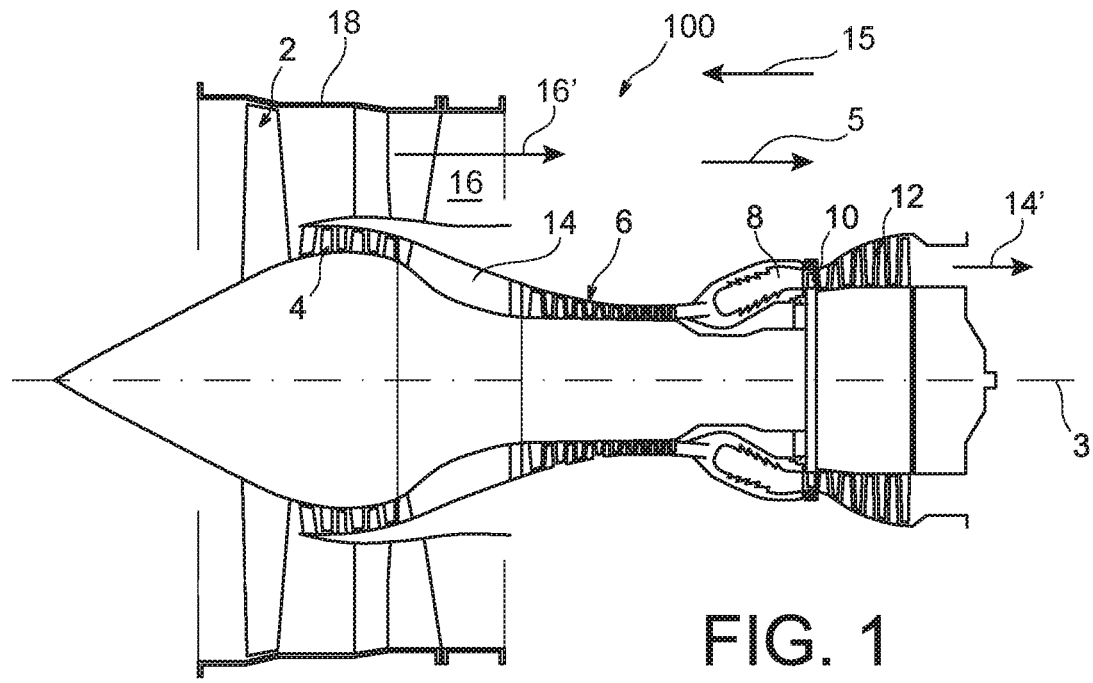
FIG. 1 shows a schematic view of a turbojet engine according to the invention, in longitudinal section.

With reference first of all to FIG. 1, an aircraft turbine engine 100 according to the invention is shown. This is a twin-spool bypass turbine engine. Nevertheless, it could be a turbine engine of another type, for example a turboprop engine, without departing from the scope of the invention.

The turbine engine 100 has a longitudinal axis 3 around which its various components extend. It comprises, from upstream to downstream in a main direction 5 of flow of the gases through this turbine engine, a fan 2, a low-pressure compressor 4, a high-pressure compressor 6, a combustion chamber 8, a high-pressure turbine 10 and a low-pressure turbine 12. These elements delimit a primary duct 14 through which a primary flow 14' passes, while a secondary duct 16 surrounds the primary duct while being delimited partially by a fan casing 18 and having a secondary air flow 16' pass through it.

In the following description, the terms "front" and "rear" are considered in a direction 15 opposite to the main direction 5 of flow of the gases in the turbojet engine, and parallel to the axis 3. On the other hand, the terms "upstream" and "downstream" are considered in this same main direction of flow 5.

Figure 2:
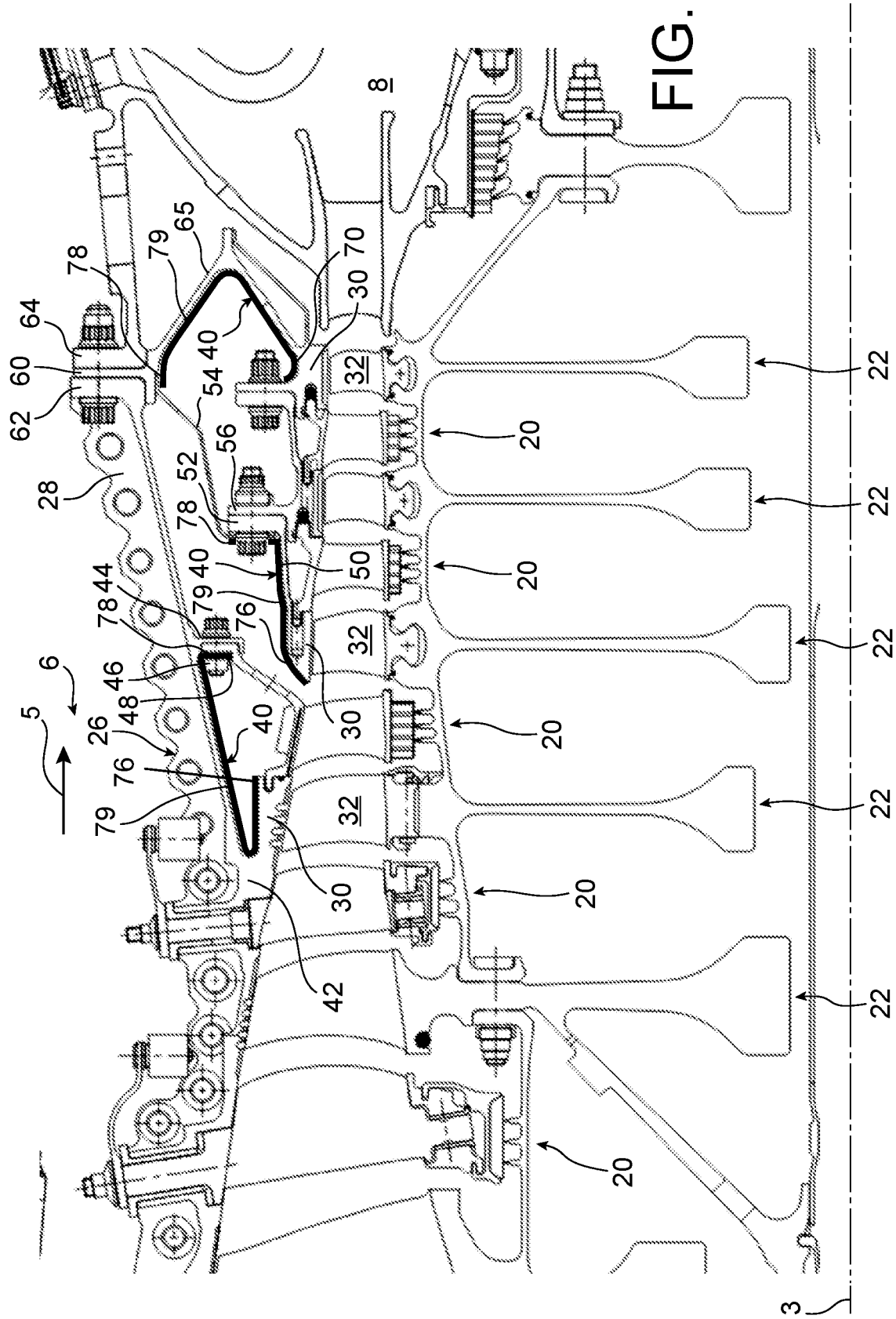
FIG. 2 is a view in longitudinal half section showing a part of the high-pressure compressor of the turbine engine shown in the previous figure.

With reference now to FIG. 2, the high-pressure compressor 6 of the turbojet engine is shown, which constitutes one of the modules of the turbine engine on which the invention can be implemented, in the same way for example as the low-pressure turbine and the high-pressure turbine.

The compressor 6 comprises a succession of stages formed by fixed guide vane assemblies 20 and movable impellers 22, these stages being surrounded by a compressor casing 26. Each impeller 22 is in a single piece, or produced from a disc carrying blades attached at the periphery thereof. The casing 26 comprises a plurality of parts, in particular an external casing 28 composed of one or more annular parts that are situated radially furthest to the outside. It also comprises, associated with each movable impeller 22, a sealing ring 30 that surrounds this impeller, leaving only a small clearance between the end of the blades 32 and the internal surface of the ring, generally of the abradable type. The ring 30 is preferentially sectorized, namely it is formed by means of a plurality of angular sectors placed end to end. Thus, in the remainder of the description, the term "ring" will be considered to be a complete ring, or to be an angular sector thereof.

The sealing ring 30 is situated radially towards the inside with respect to the external casing 28, being connected to the latter by mechanical connection means, which may take various forms according to the ring in question.

Whatever the case, one of the particularities of the invention lies in the association of a capillary heat pipe 40 with at least one of the rings 30. Preferably, at least one of these rings 30 is in fact equipped with a plurality of heat pipes 40 distributed circumferentially around this ring. It is a case of individual capillary heat pipes following each other in the circumferential direction, or an angular wall including a plurality of heat pipes connected to one another.

In all cases, the heat pipes are preferentially in the form of tubes, with a flexible character, so as to adopt a non-straight shape once installed in the casing 26. The heat pipes thus have curvatures, elbows or folds making it possible to follow the curvatures associated with the corresponding casing.

In FIG. 2, three sealing rings 30 have been shown, being equipped with such capillary heat pipes 40. Among these three rings, the one that is furthest to the left in this figure comprises a heat pipe 40, a first end 76 of which is fixed to the external surface of the ring, covering it. The fixing is preferably done by a welded connection. From this first end 76, the heat pipe has an adiabatic zone 79 that first of all runs along a radial connection member 42 that connects the ring 30 to the external casing 28. Next, this adiabatic zone 79 runs internally along the external casing 28 as far as the second end 78 of the heat pipe, which for its part is fixed to a bolted fixing flange 44. This flange 44 is secured to the external casing 28, and fixed by bolts 46 to another flange 48, which carries one of the axial ends of the guide vane assembly 30, the other end of which cooperates with the ring 30 in question.

The second end 78 is thus fixed by bolts, while the adiabatic zone 79 is preferentially fixed by welding to the radial connection member 42 and to the external casing 28.

Still with the three rings in FIG. 2, the one at the centre comprises a heat pipe 40, the first end 76 of which is fixed to the external surface of the ring. From this first end 76, the heat pipe has an adiabatic zone 79 that runs along a connecting flange 50, the latter terminating in a bolted fixing flange 52. It is to this flange 52 that the second end 78 of the heat pipe is fixed. It should be noted that the flange 52, situated radially towards the outside with respect to its associated ring 30, is itself carried by a guide vane assembly flange 56, these two flanges being arranged at a distance and radially towards the inside with respect to the external casing 28.

Finally, for the third ring 30 furthest to the right, its heat pipe 40 has a first end 76 fixed to the external surface of the ring, as well as a second end 78 fixed to the base of a bolted flange 60 gripped between two flanges 62, 64 of the external casing 28. Between its two ends, the heat pipe has an adiabatic zone 79 that runs along and is fixed to a flange 65 in the form of a V open axially towards the upstream end, this flange preferably being produced in a single piece with the ring 30 and the bolted flange 60.

Each of the heat pipes 40 has a substantially identical design. The design of the heat pipe 40 associated with the flange 48 will now be described, with reference to FIG. 3.

First of all, it should be stated that the capillary heat pipe 40 is a high-performance heat dissipation device, which advantageously makes it possible to extract the heat from the sealing ring 30 in order to transfer it to the bolted flange 48, or vice versa. In the remainder of the description of the heat pipe, the case where the ring 30 constitutes a hot source and the flange 48 a colder source will now be presented. Nevertheless, when the functioning of the engine is such that the temperature differential between these two elements is reversed, the cycle described below then takes place in a similar manner, but in an opposite direction. This functionality is conferred by the reversible character of heat pipes with a so-called "capillary" design.

The heat pipe 40 therefore makes it possible to discharge high densities of heat flow between two media with different temperatures, here the ring 30 and the bolted flange 48 situated radially to the outside, in a better cooled zone with a lower temperature.

This transfer of energy takes place by means of a heat-transfer fluid in the saturated state, such as water. The latter, in the liquid state, evaporates in the heating zone, referred to as the evaporator 77, and terminating in the evaporation end 76 fixed to the ring 30. The vapour thus formed flows through the adiabatic zone 79 in order to condense in the cooling zone or condenser 80, terminating in the condensation end 78 fixed to the flange 48. Thus, by profiting from the changes in phase of the heat-transfer fluid, the heat pipe 40 makes it possible to take off heat at the sealing ring 30 and to redistribute it in the bolted flange 48. These two elements then form an assembly having thermal inertia greater than that of the ring 30 alone.

Figure 3:
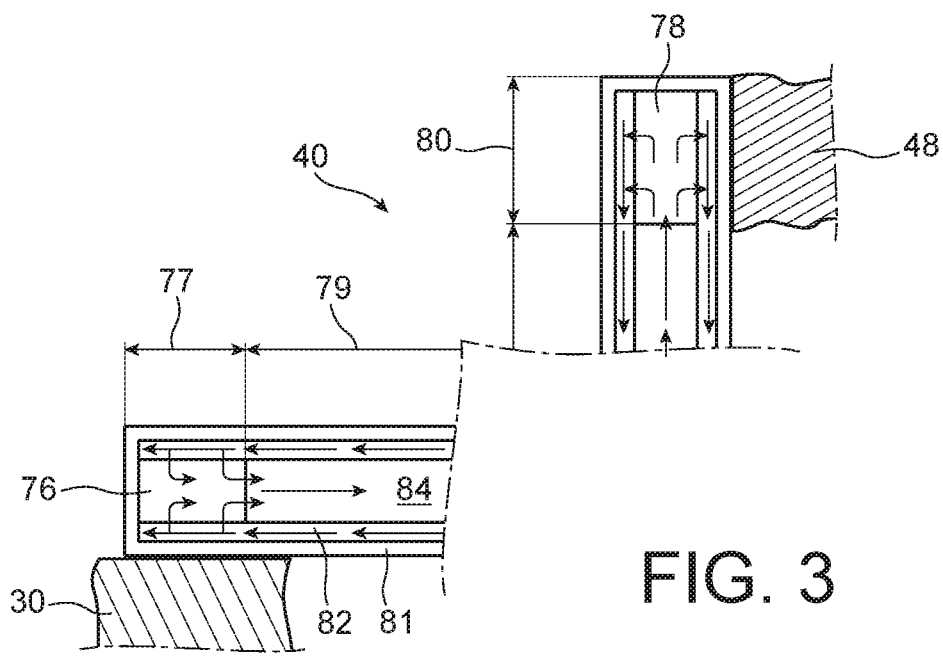
FIG. 3 is a schematic view detailing one of the heat pipes equipping the compressor of the previous figure.

By way of indicative example shown in this FIG. 3, the heat pipe 40 is a flexible tube 81, the internal walls of which are covered with a capillary network 82 saturated with liquid, and a space 84 filled with the saturated vapour of this same liquid. Thus, at the heat source formed by the ring 30, there is evaporation of the liquid present in the capillary network 82. Because it is colder at the cold source formed by the bolted flange 48, the vapour is directed to it and condenses thereon. The condensate next returns to the ring by virtue of the capillary network 82, and the cycle can then be repeated, without maintenance or addition of energy, and hence the passive character of the system.

Aspects of the behaviour of the clearance at the blade tip of one of the movable impellers of the high-pressure compressor will now be described.

Various engine speeds will be mentioned, and more particularly an acceleration phase and a deceleration phase. The change in the clearance at the blade tip in the compressor according to the invention will be compared with the change in this same clearance in a compressor of the prior art not comprising heat pipes.

During the acceleration phase, the behaviour of the two clearances is identical or similar. However, as soon as the stabilisation phase begins, the compressor according to the prior art has a clearance at the blade tip that increases greatly, in order to form a variation termed "thermal hump". This is explained by the difference in thermal response time between the ring and the impeller, the latter having much greater mass, in particular because of the central disc of this impeller. On the other hand, during this same stabilisation phase, the clearance in the compressor according to the invention is contained, by virtue of the heat transfer made by the heat-exchange media from the ring to a casing element situated radically towards the outside.

During the deceleration phase, the clearances behave in an opposite manner, the thermal hump being in fact reversed compared with the one observed in acceleration. In this case, over-consumption of clearance is created in deceleration, which may cause an increase in wear to the abradable material, and in addition an opening of the clearance over the speed ranges important for the engine performance, as in the case of stabilised cruising speed for example. In the invention, this thermal hump is not observed since the casing element to which the second end of the heat pipe is connected then fulfils a function of hot source, capable of supplying heat to the colder ring, via the heat pipe.

In the case of the invention, the absence of "thermal humps" means that the clearance at the blade tip changes in a small range of values. Consequently, apart from the fact that the clearance is reduced in operation after an acceleration phase, the initial clearance at takeoff, or cold clearance, may also be reduced. Appreciable gains in global performance of the turbojet engine result therefrom.

Figure 4:
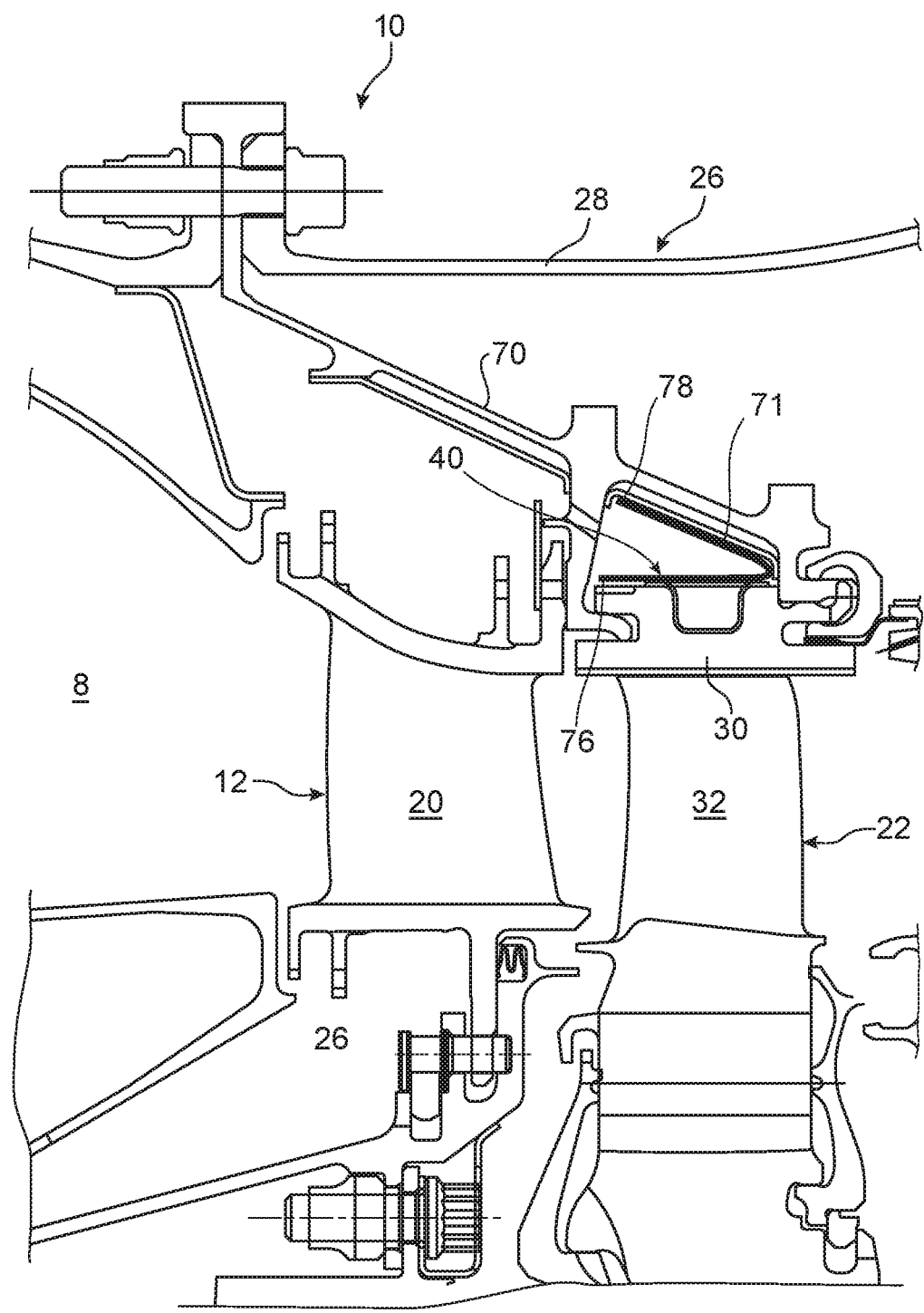
FIG. 4 is a view in longitudinal half section showing a part of the high-pressure turbine of the turbine engine shown in FIG. 1.

Finally, FIG. 4 shows another embodiment in which the invention is installed in a high-pressure turbine 10, each heat pipe 40 having its first end 76 fixed to the external surface of the ring 30, and its second end 78 fixed to a flange 70 for fixing the ring 30 to the external casing 28 of the turbine casing 26. The adiabatic zone 71 also runs along this flange 70, to which it is preferentially welded.

In the case of the application of the invention to a turbine, it should be noted that the heat pipes could be provided in addition to solutions of active control of the clearances of the LPTACC or HPTACC type, using a principle of control of the clearances by air jets. Such a hybrid solution would make it possible to reduce the flow of air taken off for controlling the clearances, and thus to gain in overall performance. In this case, the heat pipes would preferably make it possible to reduce wear in transient phases, during which the clearances are smaller. The systems of the HPTACC and LPTACC type would then keep their function of reducing the clearances in cruising phase, but with an air flow reduced compared with the conventional system.

Naturally various modifications may be made by a person skilled in the art to the invention that has just been described solely by way of non-limitative examples.

The invention claimed is:

1. An aircraft turbine-engine module casing comprising:
   an external module casing;
   at least one sealing ring configured to surround a movable impeller and arranged radially inside of said external module casing; and
   at least one capillary heat pipe that is a non-straight tube with two opposite ends, the two opposite ends including a first end that is an evaporator and is directly connected to an outermost radial external surface of a sealing ring of the at least one sealing ring and covers the outermost radial external surface, and a second end, opposite to the first end, that is a condenser and is directly connected to a casing element arranged radially outside of the sealing ring such that an entire portion of the second end that is directly connected to the casing element is integrally arranged radially outside relative to an entire portion of the first end that is directly connected to the sealing ring.

2. The aircraft turbine-engine module casing according to claim 1, wherein the casing element to which the second end of the at least one capillary heat pipe is fixed is the external module casing or means for the mechanical connection of the sealing ring to the external module casing.

3. The aircraft turbine-engine module casing according to claim 1, wherein the casing element to which the second end of the at least one capillary heat pipe is fixed is a flange for bolted fixing of the external module casing, and/or in that the first end is welded to the outermost radial external surface of the sealing ring.

4. The aircraft turbine-engine module casing according to claim 1, wherein the at least one capillary heat pipe is, between the first end and the second end, fixed to means for the mechanical connection of the sealing ring to the external module casing.

5. The aircraft turbine-engine module casing according to claim 1, wherein the at least one capillary heat pipe includes a plurality of capillary heat pipes distributed circumferentially around each sealing ring of the at least one sealing ring.

6. The aircraft turbine-engine module casing according to claim 5, wherein each capillary heat pipe of the plurality of capillary heat pipes includes a tube.

7. The aircraft turbine-engine module casing according to claim 6, wherein the tube of each capillary heat pipe of the plurality of capillary heat pipes includes a capillary network on an internal wall of the tube.

8. The aircraft turbine-engine module casing according to claim 1, wherein the at least one capillary heat pipe includes a plurality of capillary heat pipes and each capillary heat pipe of the plurality of capillary heat pipes includes a non-straight tube.

9. An aircraft turbine engine comprising:
 a module equipped with the aircraft turbine-engine module casing according to claim 1.

10. The aircraft turbine engine according to claim 9, wherein the module is a turbine or a compressor.

11. The aircraft turbine-engine module casing according to claim 1, further comprising a bolt, wherein the first end is fixed to the sealing ring by the bolt or the second end is fixed to the casing element by the bolt.

12. The aircraft turbine-engine module casing according to claim 1, wherein the at least one capillary heat pipe includes a heat-transfer fluid that evaporates in the first end and condenses in the second end.

* * * * *